United States Patent

[11] 3,572,912

| | | |
|---|---|---|
| [72] | Inventor | Henry A. Knoll<br>Penfield, N.Y. |
| [21] | Appl. No. | 866,425 |
| [22] | Filed | Oct. 6, 1969 |
| [45] | Patented | Mar. 30, 1971 |
| [73] | Assignee | Bausch & Lomb, Incorporated<br>Rochester, N.Y.<br>Continuation of application Ser. No. 555,438, June 6, 1966, now abandoned, which is a Continuation-in-part of application Ser. No. 441,141, Mar. 19, 1965, now abandoned. |

[54] METHOD OF AND APPARATUS FOR TESTING AMETROPIA BY LASER REFRACTION
24 Claims, 7 Drawing Figs.

[52] U.S. Cl. ............................................. 351/36,
351/27, 351/28, 351/34, 351/37, 351/39
[51] Int. Cl. .................................................. A61b 3/02
[50] Field of Search ........................................ 351/1, 13,
17, 28, 21, 27, 29, 30, 34, 36, 37, 39

[56] References Cited
UNITED STATES PATENTS

| | | | |
|---|---|---|---|
| 2,995,065 | 8/1961 | Wright et al. | 351/29 |
| 1,174,547 | 3/1916 | Clason | 351/30 |
| 1,306,735 | 6/1919 | Armbruster | 351/37 |
| 1,564,495 | 12/1925 | Sheard | 351/34 |
| 1,647,017 | 10/1927 | Reaves | 351/37 |
| 1,921,318 | 8/1933 | Morrison | 351/13 |
| 2,080,614 | 5/1937 | Lee | 351/34 |
| 2,107,305 | 2/1938 | Ogle | 351/27 |

OTHER REFERENCES

Proceedings of the IRE, Rigden, et al. " The Granularity of Scattered Optical Maser Light," Vol. 50, Nov. 1962 pp 2367, 2368

Proceedings of the IEEE, B. M. Oliver, " Sparkling Spots & Random Diffraction," Vol. 51, Jan. 1963, pp 220 & 221

JOSA, " Demonstration of Chromatic Aberration in the Eye Using Coherent Light," Vol. 55, #5, May 1965 pp 575 & 576

*Primary Examiner*—David Schonberg
*Assistant Examiner*—Paul A. Sacher
*Attorney*—Frank C. Parker

ABSTRACT: A method of and apparatus for testing eyes by laser refraction are provided in which a laser beam is projected onto a distant rotating and diffusing screen which is viewed by the patient. A visual pattern is formed on the screen which, to eyes having abnormal refractive condition, appears to move when the screen is rotated. The direction and rate of the apparent movement are indications of the type and magnitude of refractive abnormality present in the eyes. By rotating the screen along an axis parallel to the laser beam, astigmatic abnormalities are determined. The system in combination with various other equipments such as refractors and variable focal length telescopes provides direct correction of the refractive abnormalities of the eyes being tested. The direct correction is achieved by either terminating the apparent motion of the pattern, or by quantitatively determining the direction and rate of the motion.

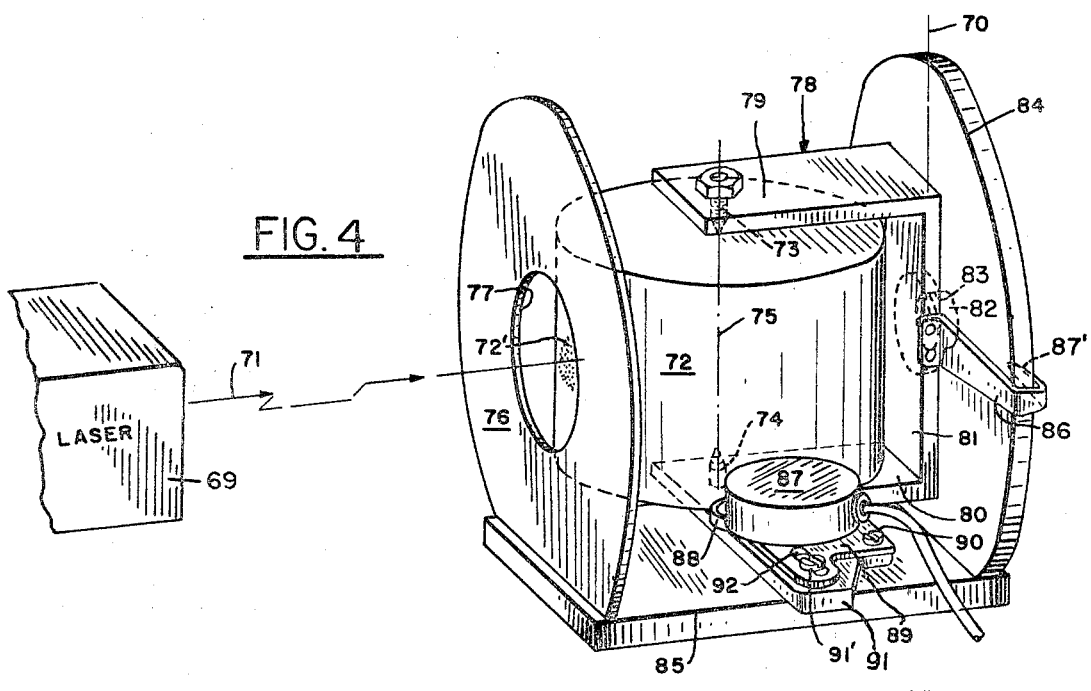
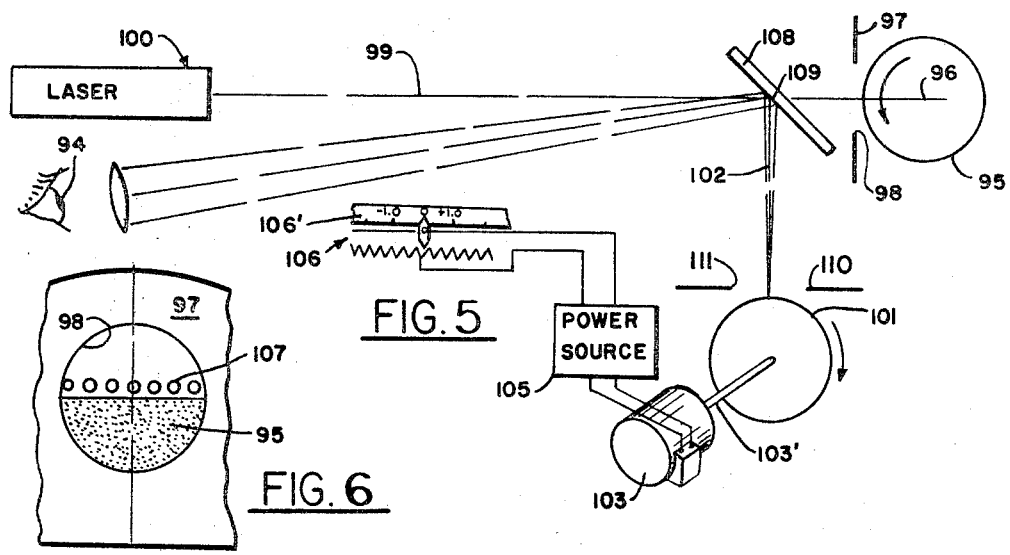
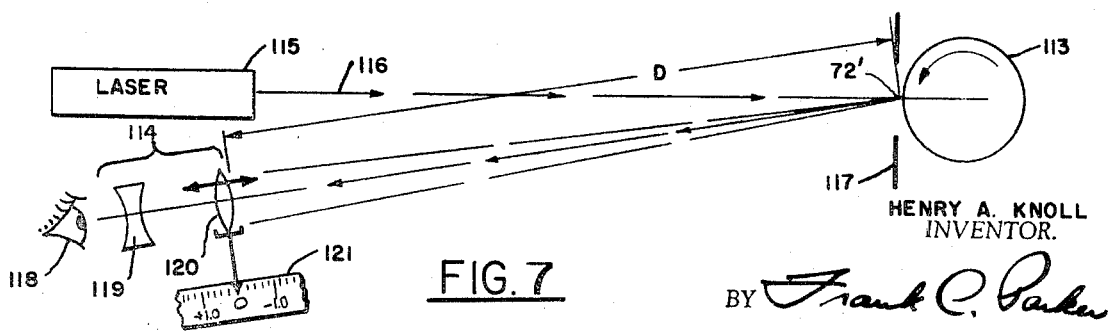
HENRY A. KNOLL
INVENTOR.
BY Frank C. Parker
ATTORNEY

METHOD OF AND APPARATUS FOR TESTING AMETROPIA BY LASER REFRACTION

The present application is a continuation of my abandoned application, Ser. No. 555,438, filed Jun. 6, 1966, which is a continuation-in-part of my, now abandoned application, Ser. No. 441,141, filed Mar. 19, 1965.

BACKGROUND OF THE INVENTION

1. Field of the Invention

This invention relates to a novel method of and apparatus for testing eyes and more particularly to ophthalmic instruments.

2. Brief Description of the Prior Art

Visual classification tests are often employed to determine the work performance and ability of students, workers, members of the armed forces and other groups of persons through their visual ratings. In conducting visual tests of this character, attempts have been made to conduct the tests under standardized conditions of, for example, illumination and distance.

Customary practice is to carry these tests to the group of persons to be tested in order to minimize the interference with their work or duties. Accordingly, similar tests of several groups of persons may be conducted in different parts of a building or factory. Because of this, the tests have generally been made in varied surroundings and under diversified circumstances. Under these circumstances, conditions for standardized lighting are not readily available and multiple problems are encountered. For example, attempts have been made to conduct these tests at standard distances and with standard means of illumination while checking near and far vision. The surroundings and means at hand such as the seating or positioning of a person for testing often precludes maintaining the persons eyes at the distance from the target preferred for vision testing.

One approach to overcome these difficulties has been disclosed in the patent to F. W. Jobe et al., Ser. No. 2,364,793. The devices disclosed therein have realized wide spread commercial success for acuity testing, however, use of the device requires that each patient or person be tested individually. Tests of this type also fail to indicate the refractive condition of an observer's eyes. Testing patients individually expends a substantial amount of time. It is becoming much more evident that a significantly large portion of the population cannot be tested because of the demands and costs of individual testing.

The increased interest in screening applicants and others for visual defects such as the refractive condition of the eyes has produced a substantial demand for an improved testing method, and apparatus which are adaptable for accurately testing the eyes of a relatively large group of persons simultaneously.

SUMMARY OF THE INVENTION

Advantageously, a novel method and novel apparatus disclosed herein are adaptable for simultaneously measuring the refractive condition of an entire group. These novel methods and apparatus will enable the ophthalmic profession to serve a significantly large portion of the population which have heretofore been neglected. For example, a large group taken from an underprivileged area may be simultaneously tested to thereby screen those persons for subsequent individual visual examination. The testing may be readily conducted in their areas and the tests will indicate those members of the group having myopia, astigmatism, or hyperopia. Further, these tests may be readily and easily conducted under widely differing conditions of distance and illumination and an operator can be prepared to conduct the tests after only a slight amount of training.

Even though the tests may be administered by an operator of little training and without any critical requirements for distance or background illumination, the test is reliable, and readily indicates those persons who need corrective measures. The tests indicate the need for corrective measures and also the nature of the corrective measures needed.

Additionally, the apparatus disclosed herein is adaptable for use in a clinic or an office of an ophthalmologist or optometrist. The use of the apparatus by the skilled members of the profession will increase their efficiency. For example, the apparatus will enable them to test patients more rapidly and thoroughly to thereby enable them to serve a larger portion of the community. Subsequent to an initial screening, the devices are used with a refractor to obtain improved results in a shorter time interval. When the devices disclosed herein are used in combination with a refractor, a relatively narrow bracket of the visual zone of correction is more readily obtainable.

Recent developments in the field of the production of electromagnetic energy have provided a family of new devices for generating coherent radiation in the infrared, visible and ultraviolet frequency bands. Devices of this type are generally referred to as "lasers" or "optical lasers." The term laser is an acronym taken from "light amplification by the stimulated emission of radiation."

Lasers have for the most part been utilized as laboratory light sources, however, laser applications range from communications to eye surgery. The more recent development of a gas laser has extended the field of laser applications since the newer devices produce continuous light rather than a brief flash of light.

It has now been found advantageous to extend the use of a laser to a diagnostic instrument wherein it will be possible to diagnose certain abnormalities in an observer's vision in an improved manner.

Briefly, a method according to the present invention includes the step of providing a coherent beam of visible light. The coherent light is diffused to thereby produce a visual pattern and relative movement between an observer and the pattern is provided. The diffused light produces a pattern and the perceived movement of that pattern is an indication of the observer's visual condition.

The apparatus according to the present invention comprises means providing a coherent beam of light and means diffusing the light. Means are also provided for changing the relative position of the diffusing means and an observer. In a subsequent step, the magnification of the visible light pattern is varied to give an indication of abnormal eye condition, and in another step, means are provided for judging the degree of said abnormal eye condition.

BRIEF DESCRIPTION OF THE DRAWINGS

The invention will now be described in connection with the accompanying drawings, wherein:

FIG. 4 is a schematic perspective view of an effective form of said invention;

FIG. 5 is a diagrammatic view of another form of said invention;

FIG. 6 is a side elevational view showing an operating portion of the mechanism shown in FIG. 8; and FIG. 7 is a diagrammatic view of still another form of said invention.

DETAILED DESCRIPTION OF THE ILLUSTRATED EMBODIMENTS

Figure 1:
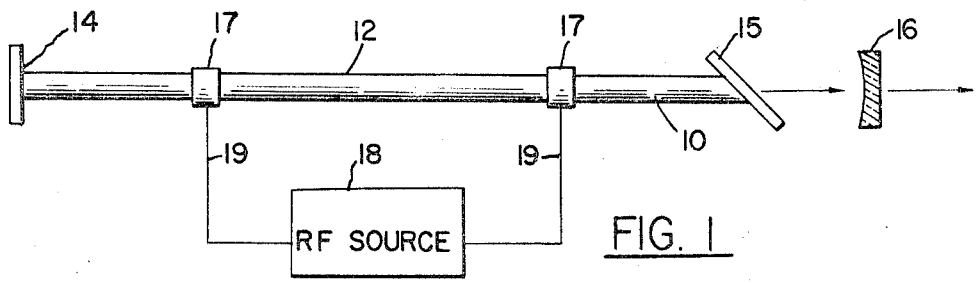
FIG. 1, is a diagrammatic view partly in section of a laser of the type suitable for use in devices according to the principles of the present invention.

The laser shown in FIG. 1 comprises a laser tube chamber 10 having a cylindrical sidewall 12 and a mirrored end plate 14. The chamber which may, for example, be about 6 millimeters in diameter and about 45 centimeters in length contains a suitable gas such as helium-neon vapor. Any other source of visible coherent light may be used, however, the laser comprises a presently preferred source of illumination and is described for purposes of illustrating the invention. It has also been found that other sources of coherent light as well as other types of lasers are operative. For example, a source of coherent light such as a small source or pinhole may be described with reference to page 737 of "Fundamentals of Optics" by Jenkins and White, 2nd Edition, 1950, McGraw-Hill, wherein it is stated "It is a characteristic of any interference experiment with light that the source must have this point to point phase relation, and sources which have this relation are called 'coherent sources'."

The laser unit comprises the laser tube 10 which is filled with the suggested helium-neon gas mixture. The ends of the tube comprise the plane mirror 14 and a Brewster window 15. A concave mirror 16 is disposed on the optical axis of the system and is mounted so that it can be tilted about two orthogonal axes for mode selection. The concave mirror 16 may, for example, have a radius of 500 millimeters and would be disposed at slightly less than 500 millimeters from the opposite end of the laser, i.e., from the mirror 14. The mirrors 14 and 16 are coated and reflect approximately 99 percent of the incident light.

A pair of electrodes 17 are connected to a power unit 18 by means of a pair of leads 19. The power unit 18 which may, for example, comprise a 27 megacycle per second frequency oscillator which continuously ionizes the gas mixture in the tube 10.

Figure 2:
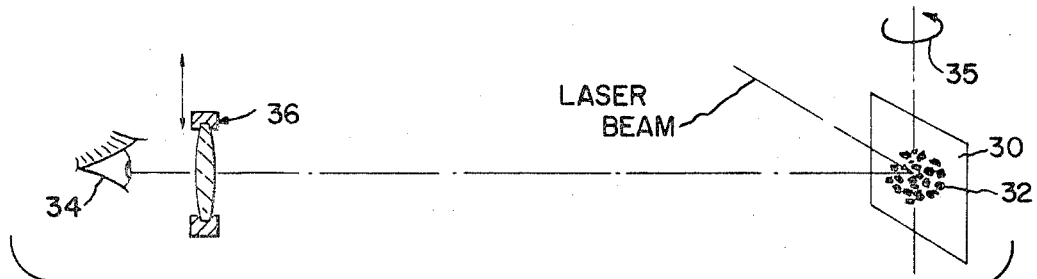
FIG. 2 is a diagrammatic view illustrating one embodiment of the invention.

When the light from a continuously acting laser such as the one shown in FIG. 1 is projected onto a diffusely reflecting screen 30 shown in FIG. 2, a visible granular pattern 32 is produced. If the screen 30 is moved relative to either eye 34 of an observer in the the rotational direction of the arrow 35, the granular pattern 32 appears to move. If the movement of the granular pattern 32 is in the same sense as the relative movement between the screen and the observer, i.e., if the eye 34 is motionless and the screen 30 is rotated to the right, in the direction of the arrows 35, and the granular pattern 32 appears to move to the right, the eye 34 is myopic. If the movement of the granular pattern 34 appears to be in the opposite sense the eye 34 is hyperopic. If there is no relative movement the eye 34 is emmetropic with respect to the screen 30.

In those cases wherein the eye 34 is astigmatic, the apparent movement will depend on the refractive state of the eye 34 in the plane of movement. For example, if the eye 34 has mixed astigmatism, that is, myopic in the vertical meridian and hyperopic in the horizontal meridian, then up and down motion of the head with a motionless screen will produce movement of the granular pattern in the opposite sense and sideways motion will result in movement of the granular pattern in the same sense. At some diagonal direction the eye 34 will be emmetropic and transverse movement in this plane will produce no movement of the granular pattern 32. Apparatus for measuring astigmatism is described hereinafter.

The above-described device can be used as a screening device. Since these movements can be seen at various distances and at various angles from the screen, many persons can observe the movements at the same time. A refractor 36 may be placed in front of the eye 34 so that lenses of various powers are placed before the eye 34, along with lenses to correct the hyperopia, minus lenses to correct the myopia and toric lenses to correct the astigmatism. The lenses can be chosen which will eliminate the movement of the granular pattern 32. This procedure may be used as a method of refracting one or more persons as they watch the movements of the granular pattern 32. As mentioned hereinafter, means for continuously varying the power of the refractor lens may be provided.

Figure 3:
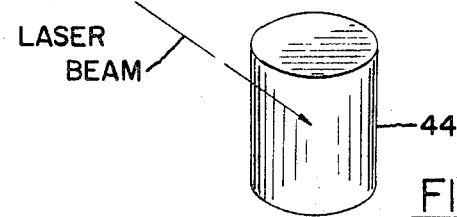
FIG. 3 is a schematic view illustrating a rotatable screen according to the second embodiment of the invention.

Displacement of the screen can also be accomplished as shown in FIG. 3. As illustrated in FIG. 2 the screen 30 is rotated about a vertical axis at a relatively slow speed, for example, about 1 revolution per hour to thereby produce the movement of a granular pattern. Similarly, a drum 44 shown in FIG. 3 may be rotated about a vertical axis to produce a horizontal movement.

The observation of the movements may be easier to see if black crosslines are placed on the fixed screen or the rotating screen or just in front of the rotating drum. In astigmatism the motions are made along the principal meridians and the crosslines are made parallel to these principal meridians.

Another embodiment of the invention uses a laser spot as a target in an optometer. A longitudinally moving cross hair or aperture would be caused to be moved until parallax was eliminated between the pattern and the cross hair or aperture.

As mentioned heretofore, the present invention contemplates means for ascertaining astigmatic conditions of the human eye and for that purpose the novel method and apparatus is described herebelow, with particular reference being made to FIG. 4.

The method for determining the astigmatic refractive condition of the eye comprises the steps of:

a. projecting a continuous beam of coherent visible light onto a distant screen 72;
b. diffusing said light to thereby produce a visual pattern 72' on the screen;
c. causing movement of said pattern 72' transversely to the axis 71 of said beam; and
d. measuring the apparent angle between the direction of said movement and a vertical central axis 70.

Thereby the apparent direction of movement of the perceived pattern defines the axis of astigmatism and consequently indicates the astigmatic condition of the eye directionally in addition to the above-described quantitative indication.

The apparatus whereby the astigmatic axis is determined is best shown in FIG. 4 and comprises a laser type of light source 69 which projects a continuous beam of coherent light along the projection axis 71. The light is diffusely reflected upon impingement from the peripheral surface of the drum-type screen 72 which is rotatably mounted on pivots 73 and 74 for rotation about an axis 75 similar to that illustrated in FIG. 3.

An erect diaphragm wall 76 is provided ahead of and spaced from the drum 72, the wall 76 having an aperture 77 formed therein symmetrically of the axis 71 and the axis 75. Laser light which is projected along the axis 71 produces the aforesaid pattern 72' of visible granular spots on the cylindrical surface of the drum 72.

For the purposes of this invention, the axis 75 of the drum 72 is tiltable away from the vertical position and such movement is achieved by securing the aforesaid pivots 73 and 74 in the opposite terminal portions of a supporting yoke 78 having two parallel arms 79 and 80. The arms 79 and 80 are connected by a rigid back plate 81 on which is centrally formed a trunnion 82 extending horizontally parallel to the arms 79 and 80, the axis of the trunnion 82 being arranged substantially coaxially with the light beam axis 71.

The trunnion 82 is fitted for rotation within a bearing surface 83 formed in a circular rear plate 84 which is secured in a fixed position in any suitable manner to a base plate 85 so as to support the yoke 78 thereon. Likewise, the aperture plate 76 is fixed in any suitable manner to the base plate 85 so that the axis of the trunnion 82 is approximately aligned with the longitudinal axis 71 of the aperture 77.

In order to indicate the angular position of the drum axis 75 with respect to a vertical or plumb axis so as to show the inclination of the astigmatic axis of the patient's eye, an indicator arm 86 is fixed to the yoke 78 in approximately radial position with respect to the axis of the trunnion 82. The arm 86 extends around the rim of the circular plate 84 freely so that the tip 87' of the indicator arm 86 cooperates with an arcuate scale (not shown) formed on the outer face of the plate 84.

Means for slowly rotating the drum 72 are provided comprising a suitable electrical motor unit 87 which drives a rubber tire-equipped friction-drive wheel 88. The motor unit 87 is built onto an adjustable base plate 89 which is pivotally secured by a screw 90 onto an extension 91 of the yoke arm 80 and is further secured by a holding screw 91' which extends through an elongated slot 92 formed in the extension 91 whereby the frictional contact pressure of the drive wheel 88 against the drum 72 may be adjusted. The rotation of the motor 87 may be in either direction.

In operation, the angular position of the arm 86 is changed slowly by the practitioner while the patient observes the moving granular pattern 72' appearing on the drum 72 within the aperture 77. The astigmatic axis of the patient's eye is indicated when the granular pattern 72' appears to flow across the aperture 77 definitely along a meridian a maximum amount. Each meridian of the eye may be tested separately.

In FIG. 5 of the drawing there is diagrammatically shown a novel method and apparatus for determining the amount of the refractive error of a patient's eye 94, said error causing the eye 94 to focus either ahead or to the rear of the front surface of drum screen 95. Apparatus by which the method is effected is described herebelow, said method comprising the steps of:
a. projecting a laser beam of coherent light upon a screen;
b. diffusing said light to form a granular light pattern on said screen;
c. producing motion of said screen transversely to the axis of said beam to cause apparent motion of said pattern; and
d. measuring the speed and direction of said pattern.

The aforesaid apparatus for carrying out the steps of the method may be provided in a plurality of forms but certain advantages of simplicity, reliability and absence of parallax are found in the combination of apparatus described herebelow. Comprised in said combination as shown in FIG. 5 is the nominally upright cylindrical drum 95, the curved surface thereof constituting a screen, which is mounted to rotate about its axis 96 and is similar to the apparatus shown in FIG. 4. Suitable mechanism, not shown, is provided for slowly rotating the drum screen 95 at a constant unidirectional speed as for example in the direction of the illustrated arrow. A diaphragm plate 97 is positioned close to the screen 95 between it and the patient and is provided with an aperture 98 through which a beam 99 of continuous coherent light is projected by a laser lamp 100.

According to the form of the invention shown in FIG. 5, the combination further includes a comparison drum 101 which is rotatably disposed upon an axis substantially parallel to the axis 96 formed by a shaft 103'. An axis 102 extending laterally from the projection axis of the light beam 99 at substantially the same level as the constant speed drum passes through screen 95, the axis of the comparison drum 101. Means are provided for rotating the comparison drum 101 at a reversible and variable speed under the control of the patient. Such means include a variable speed electric motor 102 which is connected by the shaft 103' to the comparison drum 101. The motor 103 is energized from a suitable power source 105 which is controlled by a control circuit including a control potentiometer or variable resistor 106 positioned within reach of the patient.

Around the curved outer surface of the comparison drum 101 is formed a series of indicia marks in a continuous line or pattern, as shown compositely in FIG. 6 of the drawing. The most effective form of marks was found to be an illuminated apertured scale 107. A suitable mirror 108 is located at the point of intersection 109 of axes 99 and 102 and obliquely thereof so as to reflect an image of the aforesaid indicia marks into the field of view seen in the aperture 98. A second diaphragm plate 110 is located near to the comparison drum 101. Plate 110 has an aperture 111 therein of suitable size, shape, and location such that when the image of the aperture 111 and the illuminated apertures 107 is reflected by the mirror 108 into the field of view of the eye 94, the composite image appears as shown in FIG. 6. Such a result may be achieved by half-silvering the mirror 108 to pass a large portion of the laser light to the constant-speed drum 95 and to simultaneously reflect the image of the variable-speed drum 101 to the eye of the patient. It is quite evident that other means could be utilized within the purview of this invention for superposing the image of the scale 107 on the granular light pattern appearing on the drum surface 95.

In the operation of the form of the invention shown in FIG. 5, the laser 100 is first energized and the constant-speed drum 95 is set in motion in the direction of the illustrated arrow.

The aforementioned control 106 is intended to be linearly variable, such as a slide wire-type control having an usual readout scale 106' thereof is calibrated in terms of diopters of refractive errors, both plus and minus from a "zero error" position.

The variable speed of the motor 103 is adjusted by the patient by moving a slide wire contact thereby causing the apparent speed of the granular pattern on drum 95 to match the speed and direction of the apertured scale 107 as seen in FIG. 6.

Still another form of the present invention is shown diagrammatically in FIG. 7 wherein a constantly rotating cylindrical drum screen 113 similar to the drum 44 of FIG. 3 is provided. This form of the invention depends on the use of an optical device, such as for example a zoom-type telescope 114, to effectively change the power of the patient's eye to resolve the granular pattern 72', the nominal observation distance being designated D in FIG. 10 which is an approximate median value of focal length comprised within said range.

In FIG. 7, the laser lamp 115 projects a coherent beam along an axis 116 through a diaphragm 117 corresponding to diaphragm 97 in FIG. 5. The light reflected from the drum 113 contains the granular pattern 72' which is seen by a patient's eye 118 through the zoom telescope 114. The telescope 114 is symbolized by a stationary lens member 119 which is optically aligned with an axially movable lens member 120.

Focusing movements of the lens member 120 in the directions of the illustrated double-headed arrow are indicated on a readout scale 121 which is calibrated to read the refractive error of the eye 118 in terms of diopters and fractions thereof. The focusing movement is directly affected by the patient while observing the granular light pattern 72'. At the point where the light pattern appears stationary, the reading is taken on the dial 121, either plus or minus with respect to the nominal "zero."

Although only certain forms and arrangements embodying the present invention have been shown and described in detail hereabove, other forms are possible and changes may be made in the image magnification mechanism, the apertures, and other specific details without departing from the spirit of the invention.

I claim:
1. A method of testing eyes comprising the steps of:
generating a coherent beam of visible light;
diffusing the light with a movable screen to produce a visual pattern;
moving the screen to provide an apparent movement of the visual pattern for abnormal eyes; and
measuring the rate of the apparent movement of the pattern, whereby an indication of the refractive condition of the eyes is provided.

2. A method of testing eyes comprising the steps of:
generating a coherent beam of visible light;
diffusing the light with a movable screen to produce a visual pattern;
moving the screen to provide an apparent movement of the visual pattern for abnormal eyes; and
measuring the direction of the apparent movement of the pattern, whereby an indication of the refractive condition of the eyes is provided.

3. The method of testing eyes as defined in claim 1, further including the step of measuring the rate of the apparent movement of the visual pattern, whereby an indication of the refractive condition of the eyes is provided.

4. A method of testing human eyes comprising the steps of:

projecting a coherent beam of visible light onto a distant screen;
diffusing said light to produce a visual pattern on said screen;
moving said screen to cause an apparent movement of the visual pattern for abnormal eyes; and
measuring optically the refractive error of the patient's eyes as a function of the apparent focal distance from the eyes to said pattern.

5. A method of testing a human eye comprising the steps of:
generating a continuous beam of coherent visible light;
projecting the continuous beam of coherent visible light onto a distant screen;
diffusing the beam of light so that a visual pattern is formed on the screen;
rotating the screen so that an apparent movement of the perceived visual pattern occurs with eyes having abnormal refractive characteristics; and
adjusting optically the apparent focal distance from the eye to the pattern so that the apparent movement of the perceived pattern is terminated, the apparent focal distance being an indication of the refractive error of the eye.

6. A method of testing a human eye comprising the steps of:
projecting a continuous beam of coherent visible light onto a distant screen;
diffusing said light to produce a visual pattern on said screen;
moving said screen to cause an apparent movement of the visual pattern for abnormal eyes; and
measuring the angle between the direction of said movement and a vertical axis extending through said beam, whereby the direction of the apparent movement of the perceived pattern is an indication of the axis location of the astigmatic refractive error of said eye.

7. A method of testing a person's eye comprising the steps of:
projecting a coherent beam of visible light upon a distant screen;
diffusing said light to produce a visual pattern on the screen;
rotating the screen so that an apparent movement of the perceived visual pattern occurs with an eye having abnormal refractive characteristics;
locating a second visual pattern in close viewing proximity to the first visual pattern, the second pattern being variably movable in a direction substantially parallel to the apparent movement of the first pattern; and
adjusting the rate and direction of movement of the second pattern to be coincident with the apparent movement of the first pattern, the direction and rate of the second pattern being an indication of the refractive characteristics of the person's eye.

8. A method of testing a human eye comprising the steps of:
projecting a continuous beam of coherent visible light onto a distant screen;
diffusing said light to produce a visual pattern on said screen;
moving said screen to cause an apparent movement of the visual pattern for abnormal eyes; and
measuring the speed of the apparent movement of the perceived pattern, whereby the speed of the apparent movement of the perceived pattern is an indication of the magnitude of the astigmatic refractive error of said eye.

9. The method of testing a human eye as defined in claim 8, further including the step of:
measuring the angle between the direction of said movement and a vertical axis extending through said beam, whereby the direction of the apparent movement of the perceived pattern is an indication of the axis location of the astigmatic refractive error of said eye.

10. An apparatus for testing eyes comprising:
a source of a continuous coherent beam of visible light;
a screen located in view of the eyes being tested onto which the continuous coherent beam of visible light is projected;
means for diffusing the beam of continuous coherent visible light to produce a visual pattern on the screen;
means for moving the screen to produce an apparent movement of the visual pattern for eyes having abnormal refractive conditions; and
means for determining the amount of refractive error in the eyes from the rate of the apparent movement of the visual pattern.

11. An apparatus for testing eyes comprising:
a source of a continuous coherent beam of visible light;
a screen located in view of the eyes being tested onto which the continuous coherent beam of visible light is projected;
means for diffusing the beam of continuous coherent visible light to produce a visual pattern on the screen;
means for moving the screen to produce an apparent movement of the visual pattern for eyes having abnormal refractive conditions;
means for determining the type of refractive error in the eyes from the direction of the apparent movement of the visual pattern; and
means for determining the amount of refractive error in the eyes from the rate of the apparent movement of the visual pattern.

12. The apparatus for testing eyes according to claim 11 in which:
said source of a continuous coherent beam of visible light is a laser;
said screen is a rotatable screen rotatable about an axis normal to the laser beam; and
said means for moving the screen comprises means for rotating the screen about the screen axis.

13. The apparatus for testing eyes according to claim 12 in which:
said rotatable screen is a drum screen rotatable about the screen axis; and
said means for diffusing comprises a diffusing coating on the surface of the drum screen.

14. The apparatus for testing eyes according to claim 13 which further includes:
a base on which said drum screen is rotatably supported; and in which
said means for rotating the screen comprises an electric motor supported by the base and means connecting the motor to the drum screen to drive the screen in response to the motor.

15. The apparatus for testing eyes according to claim 14 in which said means connecting the motor to the drum screen is a friction-drive member.

16. An apparatus for conducting a refraction test on a patient's eye, said apparatus having in combination:
means for projecting a coherent continuous beam of light upon a distant screen;
means for diffusing said light to produce a visual pattern on the screen;
means for moving the screen to produce an apparent movement of the visual pattern for an abnormal eye, the rate and direction of the movement being an indication of the magnitude and type of refraction abnormality in the patient's eye; and
means for adjusting the direction of movement of the screen to acquire a determination of the location of an axis of maximum apparent movement, the axis being an indication of the location of the astigmatic axis of the eye and the rate of apparent movement along the axis being an indication of the magnitude of correction required.

17. An apparatus for conducting a refraction test on a patient's eye, said apparatus having in combination:
means for projecting a coherent continuous beam of light upon a distant screen;
means for diffusing said light to produce a visual granular pattern on said screen;
means for moving the screen so that an apparent movement of the visual pattern occurs for an abnormal eye;

a continuously variable focal length telescope through which said patient views said pattern and changes the focus thereof until motion of the pattern becomes zero; and means including a focusing member calibrated in units of refractive error for measuring the refractive error of said eye as a consequence of focusing the telescope on said pattern.

18. An apparatus for conducting a refraction test on a patient's eye, the apparatus comprising:

a source of a continuous coherent beam of visible light;

a screen located in view of the patient's eye onto which the continuous beam of visible light is projected;

means for diffusing the beam of continuous coherent visible light to form a visual pattern on the screen;

means for moving the screen so that an apparent movement of the visual pattern occurs for abnormal eyes, the rate and direction of the movement being an indication of the magnitude and type of refraction abnormality in the patient's eye;

means for providing an array of comparison indicia in visual juxtaposition to the pattern;

means for variably moving the array in direction and rate; and means located adjacent to the patient for controlling the rate and direction of the array so that the rate and direction of the array may be brought into coincidence with the apparent movement of the pattern by the patient, the controlling means being calibrated in units of refractive error, whereby the refractive error of the patient's eye may be directly ascertained.

19. An apparatus for conducting a refraction test on a patient's eye, said apparatus having in combination:

means for projecting a continuous beam of coherent light upon a distant screen;

means for diffusing said light to produce a visual pattern on said screen;

a rotatable screen member on which said pattern is projected;

means for slowly rotating said member on its axis;

a second rotatable member mounted laterally of said beam;

means including a reversible variable speed motor for rotating the second member;

an aligned array of comparison indicia formed normal to the axis of rotation on the exposed face of the second rotatable member;

means including a partly reflecting mirror disposed angularly across said beam to operatively reflect said indicia toward the patient in juxtaposition to said pattern; and control means for varying the speed and direction of said motor, said last-mentioned means being calibrated in terms of refractive error of the patient's eye, whereby the refractive error of the eye is read after matching the respective rates of motion of said pattern and said indicia.

20. An apparatus for conducting a refraction test on a patient's eye, said apparatus having in combination:

a base;

a cylindrical screen having end faces supported on the base and rotatable about the axis of the screen, the screen having a diffusing coating on the surface thereof, the screen being located within the view of the eye;

a laser which emits a beam of continuous coherent visible light, the laser being distantly located from the screen and projecting the beam onto the surface of the screen normal to the axis of the screen to form a visual pattern on the screen;

means for rotating the screen about the axis of the screen so that an apparent movement of the visual pattern occurs for abnormal eyes, the rate and direction of the movement being an indication of the magnitude and type of refraction abnormality in the patient's eye; and means for rotating the screen about an axis parallel to the laser beam to acquire a determination of the location of an axis of maximum apparent movement, the last-mentioned axis being an indication of the location of the astigmatic axis of the eye and the rate of apparent movement along the axis being an indication of the magnitude of correction required.

21. The apparatus for conducting a refraction test on a patient's eye according to claim 20, which is further characterized by having a supporting member attached to said base; and in which:

said means for rotating the screen about an axis parallel to the laser beam and said means for rotating the screen about the axis of the screen together include;

a gimbal mechanism carrying said screen attached to the supporting member; and means for rotatably driving said screen about said axis of the screen.

22. The apparatus for conducting a refraction test on a patient's eye according to claim 21, which is further characterized by having:

a plate having a diaphragm opening therein attached to said base adjacent to said screen, the diaphragm opening being concentric with said laser beam and said visual pattern being viewed therethrough; and means for indicating the position of said axis of maximum apparent motion, the means being calibrated in terms of angular measurement relative to a vertical datum.

23. The apparatus for conducting a refraction test on a patient's eye according to claim 22 in which:

said means for rotating said screen comprises an electric motor adjustably attached to said gimbal mechanism and means connecting the motor to said screen to drive the screen in response to the motor; and said means for indicating the position of said axis of maximum apparent motion comprises a scale displayed on said supporting member and an indicator arm attached to said gimbal mechanism and projecting over the scale on said supporting member.

24. The apparatus for conducting a refraction test on a patient's eye according to claim 23 in which:

said screen has a pivot point in each of the end faces, the points being at the intersection of the screen axis with the end faces;

said gimbal mechanism comprises a bifurcated yoke semiencircling and pivotally connected to said screen at the pivot points, said motor and said indicating arm being attached to the bifurcated yoke, and a trunnion which is fixedly attached to the bifurcated yoke at the center thereof and which is rotatably journaled in said supporting member; and said means connecting the motor to the screen is a friction-drive member.

UNITED STATES PATENT OFFICE
CERTIFICATE OF CORRECTION

Patent No. 3,572,912      Dated March 30, 1971

Inventor(s) HENRY A. KNOLL

It is certified that error appears in the above-identified patent and that said Letters Patent are hereby corrected as shown below:

Col.2, line 66, change "FIG. 8" to -- FIG. 5 --

Signed and sealed this 26th day of October 1971.

(SEAL)
Attest:

EDWARD M. FLETCHER, JR.          ROBERT GOTTSCHALK
Attesting Officer                Acting Commissioner of Pate